Jan. 9, 1968  A. WINKLER  3,362,100
RODENT TRAP
Filed March 12, 1965
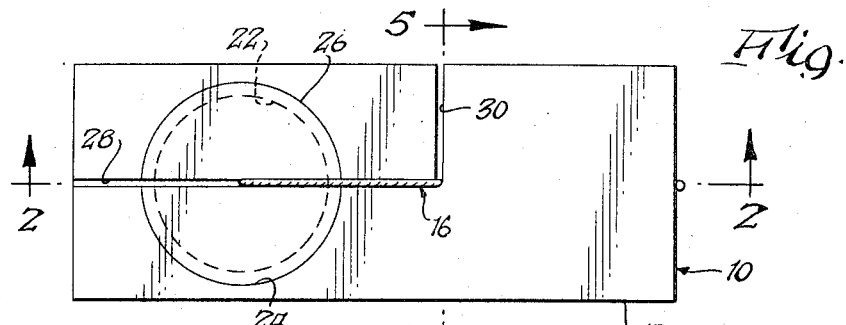
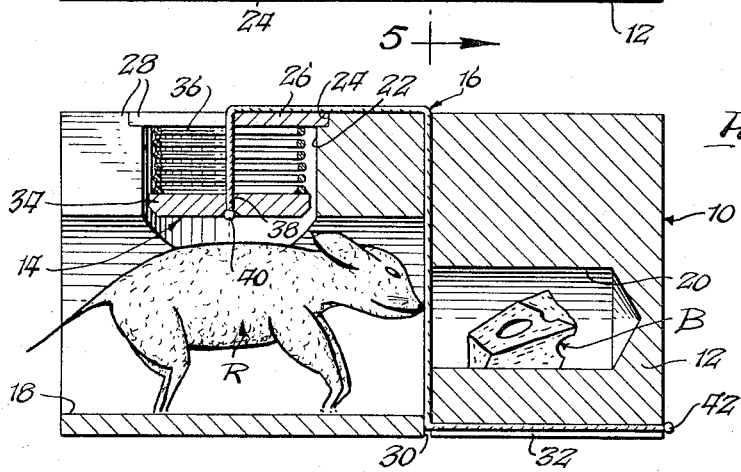
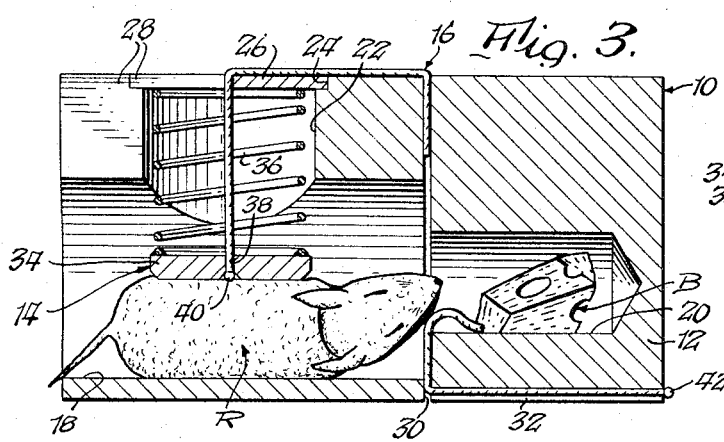
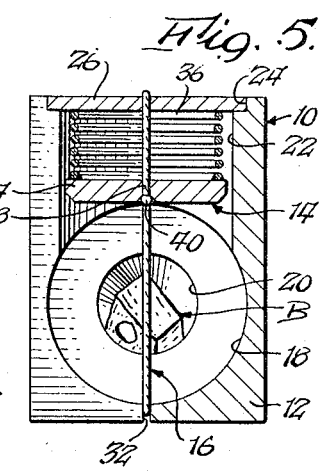
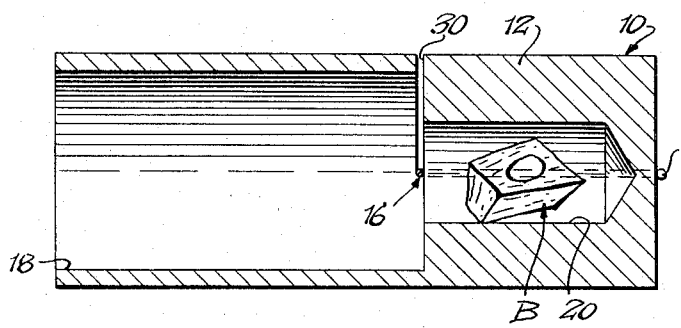
INVENTOR.
Anton Winkler
BY Popp and Sommer
ATTORNEYS

United States Patent Office 3,362,100
Patented Jan. 9, 1968

3,362,100
RODENT TRAP
Anton Winkler, Three Rod Road,
East Aurora, N.Y. 13026
Filed Mar. 12, 1965, Ser. No. 439,346
2 Claims. (Cl. 43—78)

ABSTRACT OF THE DISCLOSURE

A rodent trap including a housing block having a rodent recess communicating with a smaller bait recess and another recess containing a plunger and spring, and a chewable trigger element anchored at one end to the block, extending across the mouth of the bait recess to prevent access thereto, connected at its other end to the plunger and compressing the spring until severed by a rodent, whereupon the spring operates the plunger to clamp the rodent in its recess.

---

This invention relates to a new and improved rodent trap, and more particularly to one incorporating chewable trigger means preventing access to the bait and maintaining the trap inoperative until severed by a rodent.

One object of the invention is to provide such a trap which is so constructed and designed as to be simple and economical to make and sell as a disposable item, and thereby avoid the necessity of emptying, cleaning and resetting the trap.

Another object is to provide such a trap which is so constructed and designed as to facilitate the baiting operation without any danger of triggering the trap and injuring the fingers of the one inserting the bait.

A further object is to provide such a trap which is so constructed and designed as to be substantially tamper proof, especially by children.

Still another object is to provide such a trap which is so constructed and designed that upon completion of manufacture it can be supplied and sold with the rodent trapper means preset, and need never be reset unless reuse is desired.

A still further object is to provide such a trap which is so constructed and designed as to facilitate setting of the rodent trapper means.

Yet another object is to provide such a trap which is so constructed and designed as to be most effective and efficient in performing the desired rodent trapping operation.

Yet a further object is to provide such a trap which is so constructed and designed as to be sufficiently sturdy for repeated use, as well as readily reset, if so desired.

Additional objects and advantages of the invention will become evident upon consideration of the following detailed description and accompanying drawing, wherein:

FIG. 1 is a top plan view of a new and improved rodent trap constituting a preferred embodiment of the invention;

FIG. 2 is a longitudinal vertical sectional view taken on line 2—2 of FIG. 1, and illustrating the unique function of the chewable trigger means in preventing access to the bait by a rodent and maintaining the trapper means in inoperative position;

FIG. 3 is a longitudinal vertical sectional view similar to FIG. 2, but illustrating the trapper means in operative position following severance of the chewable trigger means by a rodent;

FIG. 4 is a longitudinal horizontal sectional view through generally the center of the trap of FIG. 2 below the trapper means, but with no rodent therein, for clarity of illustration, and FIG. 5 is a transverse vertical sectional view taken along line 5—5 of FIG. 1.

Referring to the drawing, wherein like numerals and letters indicate like parts, a trap constituting a preferred embodiment of the invention is generally indicated at 10. The scale of the drawing shows the trap 10 at about twice its normal size; however, the trap can be made of any desired size. Basically, trap 10 includes three components: a housing block 12, a trapper mechanism 14 and a chewable trigger element 16.

The housing block 12 is preferably of elongated, uniform rectangular shape and is made of any suitable material, but preferably one which is inexpensive, light in weight, and easy to work or mold, such as wood or plastic. The block 12 is provided with a first, elongated and longitudinal, horizontal and preferably cylindrical recess 18 open at one end of the block for receiving a rodent R; a second elongated and longitudinal, horizontal and preferably cylindrical recess 20 alined and communicating with but smaller than recess 18 for receiving bait B, shown as a piece of Swiss cheese. As will be evident, the size of recess 18 is sufficient to permit free entry by a rodent R, while recess 20 is made sufficiently smaller to prevent such free entry, while at the same time presenting the bait B as an apparently accessible item.

Block 12 is also provided with a third, vertical and central, preferably cylindrical upper recess 22 communicating with the top of recess 18 between the open end of block 12 and the mouth of recess 20. Recess 22 actually extends upwardly through the top of block 12 and is enlarged by an upper recess 24, preferably in the form of a circular counterbore in the top of the block. The upper end of recess 22 is closed by a circular plate or cap 26 suitably secured in enlarged recess 24, such as by an adhesive, not shown. The purpose of recess 22 is to receive the trapper mechanism 14 in the inoperative position.

In addition, block 12 is provided with a first, vertical and central, longitudinal slot 28 extending from the open end of the block, through the top of the block and plate 26 to the center of recess 22, as well as the top of recess 18. Likewise, a second vertical transverse slot 30 extends from one side of block 12 through the top and bottom of the block to the center of recess 20 at the mouth thereof, this slot being preferably formed at the juncture of recesses 18 and 20. Finally, a third, vertical and central, longitudinal slot 32 extends from the other end of block 12 through the bottom of the block to slot 30. The purpose served by these various slots 28, 30 and 32 will be described in detail below.

Turning now to the movable trapper mechanism 14, which is the second basic component of trap 10, this includes a horizontal plunger 34, preferably in the form of a circular metal disk, and which plunger is arranged in recess 22 at the mouth thereof in the inoperative position, as shown in FIGS. 2 and 5. The trapper mechanism 14 is completed by a vertical and preferably metal, coil spring 36 which is compressed between plunger 34 and plate 26 at the upper end of recess 22, while in such inoperative position. Spring 36 normally urges plunger 34 downwardly from its upper, inoperative position of FIGS. 2 and 5, to its lower, operative position clamping a rodent R in and against the floor of recess 18, as best shown in FIG. 3.

Plunger 34 is preferably chamfered along its lower peripheral edge to facilitate the desired reciprocal movement thereof, and is provided with a central through aperture 38 which is preferably countersunk at its lower end to facilitate connection with trigger element 16.

The preferred embodiment of trap 10 is completed by the third basic component, namely the chewable trigger element 16. This element is an elongated and flexible, tension (i.e. substantially inextensible) member having sufficient strength to maintain the trapper mechanism 14 in the inoperative position until severed by a rodent R. At least that portion of element 16 which extends across the mouth of recess 20 must be chewable by a rodent R, and while shown as a single element, it will be apparent that it could be composed of several elements, so long as that portion of the element extending across the mouth of recess 20 is so chewable.

In its preferred form, trigger element 16 is formed by an elongated piece of twisted or interwoven, multi-strand string or cord (as of vegetable fibers), such string or cord ordinarily being larger than a thread and smaller than a rope in cross-section. However, single strands can be used, and the fibers are not necessarily restricted to vegetable fibers, but can include animal, mineral or synthetic fibers, so long as they are chewable by a rodent. Likewise, the cross-sectional size and shape of element 16 can be varied to suit the circumstances, such as the size of the rodent to be caught, and such element obviously may be solid or hollow.

An important function of at least that portion of trigger element 16 which extends across the center of the mouth of recess 20 is to prevent entry to this recess by a rodent R. Thus, element 16 reduces each half of the mouth of recess 20 to a size less than that of the rodent's head, thereby requiring the rodent to chew and sever this portion. When so severed, element 16 suddenly releases trapper mechanism 14; whereupon the spring 36 suddenly expands downwardly to force plunger 34 downwardly at a rapid rate and slam the rodent against the floor of recess 18, clamping the rodent therein, and successfully completing the desired trapping operation.

As will be evident from FIGS. 2 and 3 of the drawing, trigger element 16 is connected at one end to plunger 34, the element passing through bore 38 in the plunger and being held in place by a bulbous protrusion 40, which is larger than bore 38 but smaller than the lower countersunk portion. This bulbous protrusion may be formed in any suitable manner, and especially in the case of string or cord may constitute a knot. As best shown in FIG. 2, trigger element 16 extends upwardly through recess 22 and spring 36, as well as slot 28, along the top of block 12, downwardly through slot 30 across the center of the mouth of recess 20 to prevent entry thereto, as noted above, as well as along and through slot 32, element 16 being anchored at its other end to the other end of block 12 by another bulbous protrusion 42 which is larger than slot 32. Once again, this bulbous protrusion could also be formed by a knot, especially when using string or cord. As also evident from FIG. 2, the length of element 16 is selected so that it will maintain trapper mechanism 14 in its upper inoperative position by being drawn tautly through the various slots and anchored to the other end of block 12, as noted above.

In order to attract the rodent R, it is necessary to bait trap 10. However, this is a quite simple operation, because the bait B can be readily dropped through recess 18 and pass on either side of the portion of element 16 straddling the mouth of recess 20, there being no danger of triggering the trap or injury to the fingers of the one inserting the bait. When a rodent R is attracted by bait B, it enters recess 18 and attempts to eat the bait. Being frustrated in this by the portion of element 16 extending across the mouth of recess 20, the rodent chews this portion until served, whereupon the trapper mechanism 14 is suddenly released to trap the rodent. Inasmuch as trap 10 is of such simple construction and is composed of economical materials it may then be disposed of, thereby avoiding the necessity of emptying, cleaning and resetting the trap.

In completing the manufacture of trap 10, the assembly of its various components is facilitated by the unique construction of housing block 12. As will be apparent, trigger element 16 is first threaded through plunger 34 and spring 36, which is preferably attached to the plunger. Next, the spring 36 may be readily compressed to pass into recess 18 from the open end of the block, the slot 28 permitting the passage of element 16. Next, it is but a simple matter to draw element 16 sufficiently taut to compress spring 36 and elevate plunger 34 to the upper inoperative position of FIG. 2, and to thread element 16 over the top of plate 26 and block 12 (each of which could also be provided with a slot, if so desired), downwardly through slot 30 and along and through slot 32, as well as to anchor element 16 at the other end of the block. Thus, by this design and construction, the trap 10 can be preset readily for distribution and sale to the user, and need never be reset unless reuse is desired. At the same time, trap 10 is sufficiently sturdy to permit such reuse, and the trigger element 16 may readily be replaced and rethreaded by the user to reset the trap by following the simple procedure set forth above.

Another feature of trap 10 is that it is substantially tamper proof, especially by children, who do not ordinarily know how to release trigger element 16, which is relatively inaccessible. An an extra margin of safety, the slot 32 could be filled with suitable adhesive following setting of the trap, to positively prevent tampering therewith.

It will now be seen how the above described invention accomplishes its various objects, and the various inherent advantages of such invention will likewise be apparent. It is to be understood that the foregoing description and accompanying drawing are to be considered in the illustrative rather than the limiting sense, and that various changes and modifications may be made in the invention by those skilled in the art, without departing from the inventive concept, the scope of which is to be determined by the appended claims. For example, the illustrated closed end of recess 20 could be provided with ventilating holes as and added inducement to a rodent to enter the trap, and if desired, a removable plug could be used to form the closed end of recess 20 and as an alternate means of facilitating baiting the trap. Likewise, the slots 28, 30 and 32 could be replaced respectively by a simple aperture in plate 26, and a central vertical hole through block 12 at the juncture of recesses 18 and 20, whereupon the trigger element 16 could be anchored at the bottom of this hole.

What is claimed is:

1. A rodent trap comprising a housing block having a first rodent receiving recess, a second bait receiving recess communicating with but smaller than said first recess, a third recess communicating with said first recess, a first through opening communicating with said third recess, and a second through opening communicating with the mouth of said second recess; a movable trapper mechanism including a plunger arranged in said third recess and a spring compressed between said plunger and the outer end of said third recess and normally urging said plunger from such inoperative position to an operative position clamping a rodent in said first recess; and an elongated and flexible, chewable trigger element connected at one end to said plunger, extending through said first and second openings and across the mouth of said second recess to prevent entry thereto, anchored at its other end to said housing block and maintaining said plunger in said inoperative position until severed by a rodent in said first recess.

2. A rodent trap comprising an elongated rectangular housing block having a first, elongated and longitudinal, horizontal rodent receiving recess open at one end of said block, a second, elongated and longitudinal, horizontal bait receiving recess alined and communicating with but smaller than said first recess, a third, vertical and central upper recess communicating with the top of said first recess between said one end of said block and the mouth of said second recess, a first vertical and central, longitudinal slot extending from one end through the top of said block to the center of said third recess and the top of said first recess, a second, vertical, transverse slot extending from one side through the top and bottom of said block to the center of said second recess at the mouth thereof, and a third, vertical and central longitudinal slot extending from the other end through the bottom of said block to said second slot; a movable trapper mechanism including a plunger arranged in said third recess and a spring compressed between said plunger and the upper end of said third recess and normally urging said plunger downwardly from such upper inoperative position to a lower operative position clamping a rodent in said first recess; and an elongated and flexible, chewable trigger element connected at one end to said plunger, extending upwardly through said spring, third recess and first slot, along the top of said block, downwardly through said second slot across the mouth of said second recess to prevent entry thereto and along and through said third slot, anchored at its other end to the other end of said block, and maintaining said plunger in said inoperative position until severed by a rodent in said first recess.

References Cited

UNITED STATES PATENTS

| | | | |
|---|---|---|---|
| 363,554 | 5/1887 | Sewel | 43—79 |
| 432,139 | 7/1890 | Kerns | 43—78 |
| 1,041,195 | 10/1912 | Thomas | 43—65 |
| 1,701,261 | 2/1929 | Fox | 43—86 |
| 1,807,171 | 5/1931 | Pisani | 43—86 |

FOREIGN PATENTS 28,017     1906    Great Britain.

SAMUEL KOREN, *Primary Examiner.*

WARNER H. CAMP, *Examiner.*

UNITED STATES PATENT OFFICE
CERTIFICATE OF CORRECTION

Patent No. 3,362,100                                    January 9, 1968

Anton Winkler

It is hereby certified that error appears in the above numbered patent requiring correction and that the said Letters Patent should read as corrected below.

Column 3, line 66, for "served" read -- severed --.

Signed and sealed this 11th day of February 1969.

(SEAL)
Attest:

Edward M. Fletcher, Jr.                                EDWARD J. BRENNER
Attesting Officer                                            Commissioner of Patents